(12) United States Patent
Cholst (10) Patent No.: US 11,936,197 B2
(45) Date of Patent: Mar. 19, 2024

(54) POWER DISTRIBUTION FOR MODULAR STORAGE

(71) Applicant: Milwaukee Electric Tool Corporation, Brookfield, WI (US)

(72) Inventor: Beth E. Cholst, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 627 days.

(21) Appl. No.: 17/124,060

(22) Filed: Dec. 16, 2020

(65) Prior Publication Data

US 2021/0104914 A1 Apr. 8, 2021

Related U.S. Application Data

(63) Continuation of application No. PCT/US2020/052749, filed on Sep. 25, 2020.

(60) Provisional application No. 62/906,964, filed on Sep. 27, 2019.

(51) Int. Cl.
| | |
|---|---|
| *H02J 50/12* | (2016.01) |
| *B25H 3/02* | (2006.01) |
| *H01M 10/44* | (2006.01) |
| *H02J 1/10* | (2006.01) |

(52) U.S. Cl.
CPC ............ *H02J 50/12* (2016.02); *B25H 3/021* (2013.01); *H01M 10/44* (2013.01); *H02J 1/10* (2013.01)

(58) Field of Classification Search
CPC . H02J 50/12; H02J 1/10; B25H 3/021; H01M 10/44
USPC ........................................................ 320/108
See application file for complete search history.

(56) References Cited

U.S. PATENT DOCUMENTS

| | | | | |
|---|---|---|---|---|
| 4,591,777 | A | * | 5/1986 | McCarty ............... H02J 7/0042 320/110 |
| 4,739,242 | A | * | 4/1988 | McCarty ............... H02J 7/0013 30/DIG. 1 |
| 5,280,229 | A | * | 1/1994 | Faude ................... H02J 7/0045 320/110 |
| 8,415,921 | B1 | | 4/2013 | Young et al. |
| 8,415,924 | B2 | | 4/2013 | Matthias et al. |
| 8,890,478 | B2 | | 11/2014 | Matthias et al. |
| 9,112,356 | B2 | | 8/2015 | Cover |
| 9,381,640 | B2 | | 7/2016 | Van Der Linde et al. |
| 9,748,794 | B2 | | 8/2017 | Rejman |

(Continued)

FOREIGN PATENT DOCUMENTS

| | | | |
|---|---|---|---|
| CA | 2590526 A1 * | 12/2007 | ............. A61B 50/33 |
| CN | 103945988 A * | 7/2014 | |

(Continued)

OTHER PUBLICATIONS

International Search Report and Written Opinion for International Application No. PCT/US2020/052749, dated Sep. 25, 2020, 13 pages.

*Primary Examiner* — Suresh Memula (74) *Attorney, Agent, or Firm* — Reinhart Boerner Van Deuren s.c.

(57) ABSTRACT

A power distribution device that couples to storage units is provided. The power distribution device a battery charger that indirectly charges batteries, such as for personal electronic devices. The device includes a top panel with a recess that receives the personal electronic devices. The device also includes interface components to couple the device to a modular tool storage unit.

19 Claims, 6 Drawing Sheets

(56) References Cited

U.S. PATENT DOCUMENTS

| | | | |
|---|---|---|---|
| 10,044,205 B1 * | 8/2018 | Voelz | H02J 7/0013 |
| 10,293,476 B2 | 5/2019 | Fleischmann | |
| 10,324,133 B2 | 6/2019 | Zeng | |
| 10,434,638 B1 * | 10/2019 | Tsai | B65D 21/0223 |
| 10,574,067 B1 | 2/2020 | Hanson | |
| 10,583,962 B2 | 3/2020 | Brunner et al. | |
| 10,618,692 B2 | 4/2020 | Hori et al. | |
| 10,651,664 B2 | 5/2020 | Sergyeyenko | |
| 2006/0006838 A1 | 1/2006 | Clarke | |
| 2007/0182367 A1 * | 8/2007 | Partovi | H02J 50/80 |
| | | | 320/108 |
| 2010/0085745 A1 | 4/2010 | Kristiansen et al. | |
| 2010/0231161 A1 | 9/2010 | Brown | |
| 2013/0048631 A1 | 2/2013 | Van Der Linde et al. | |
| 2013/0051080 A1 | 2/2013 | Van Der Linde et al. | |
| 2013/0058711 A1 | 3/2013 | Van Der Linde et al. | |
| 2013/0134276 A1 | 5/2013 | Van Der Linde et al. | |
| 2013/0278208 A1 * | 10/2013 | Rejman | H02J 50/10 |
| | | | 320/108 |
| 2013/0285604 A1 * | 10/2013 | Partovi | H04B 5/0037 |
| | | | 320/108 |
| 2014/0327396 A1 | 11/2014 | Rejman et al. | |
| 2014/0340034 A1 * | 11/2014 | Dietzel | H02J 50/10 |
| | | | 320/108 |
| 2015/0002089 A1 * | 1/2015 | Rejman | H02J 50/90 |
| | | | 320/108 |
| 2015/0015205 A1 * | 1/2015 | Ito | H02J 50/40 |
| | | | 320/113 |
| 2015/0078811 A1 | 3/2015 | Van Der Linde et al. | |
| 2015/0108943 A1 * | 4/2015 | Dietzel | H02J 50/10 |
| | | | 320/108 |
| 2015/0137745 A1 * | 5/2015 | Rejman | B25H 3/02 |
| | | | 320/108 |
| 2017/0063114 A1 | 3/2017 | Briere | |
| 2017/0166352 A1 | 6/2017 | Hoppe et al. | |
| 2018/0161975 A1 | 6/2018 | Brunner | |
| 2018/0183250 A1 | 6/2018 | Byrne et al. | |
| 2018/0186513 A1 | 7/2018 | Brunner | |
| 2019/0225371 A1 | 7/2019 | Hoppe et al. | |
| 2020/0114499 A1 * | 4/2020 | Vanko | F21V 33/0084 |
| 2020/0147781 A1 | 5/2020 | Squiers et al. | |
| 2020/0165036 A1 | 5/2020 | Squiers et al. | |
| 2022/0009064 A1 * | 1/2022 | Puzio | H01F 38/14 |
| 2023/0036215 A1 * | 2/2023 | Williams | B25H 3/04 |

FOREIGN PATENT DOCUMENTS

| | | | | |
|---|---|---|---|---|
| CN | 103945991 A | | 7/2014 | |
| CN | 104669226 | | 6/2015 | |
| CN | 105027238 A | * | 11/2015 | H01F 38/14 |
| CN | 205466044 U | * | 8/2016 | B25F 5/00 |
| CN | 206242004 | | 6/2017 | |
| CN | 206313514 | | 7/2017 | |
| CN | 107107331 A | * | 8/2017 | B25H 3/006 |
| CN | 206465063 | | 9/2017 | |
| CN | 109617218 | | 4/2019 | |
| CN | 208697388 | | 4/2019 | |
| CN | 215968664 U | * | 3/2022 | B25H 3/021 |
| DE | 102008052158 | | 4/2010 | |
| DE | 102011086799 A1 | * | 5/2013 | B25H 3/006 |
| DE | 102011086804 A1 | * | 5/2013 | B25H 3/006 |
| DE | 102011086873 A1 | * | 5/2013 | B25H 3/006 |
| DE | 102011086874 A1 | * | 5/2013 | B25H 3/006 |
| DE | 102011086875 A1 | * | 5/2013 | B25H 3/006 |
| DE | 102011086884 A1 | * | 5/2013 | B25H 3/02 |
| DE | 102012213047 | | 1/2014 | |
| DE | 202015004046 U1 | * | 10/2015 | B25H 3/006 |
| DE | 102017211006 | | 1/2019 | |
| DE | 102018102982 | | 8/2019 | |
| EP | 1868275 A2 | * | 12/2007 | A61B 50/33 |
| EP | 3244509 A1 | * | 11/2017 | H02J 50/12 |
| EP | 2782720 | | 8/2019 | |
| WO | WO11151110 | | 12/2011 | |
| WO | WO-2013014878 A1 | * | 1/2013 | |
| WO | WO14070858 | | 5/2014 | |
| WO | WO-2014145259 A2 | * | 9/2014 | |
| WO | WO-2016096408 A1 | * | 6/2016 | |
| WO | WO-2020180978 A1 | * | 9/2020 | B25H 3/02 |
| WO | WO-2021034658 A1 | * | 2/2021 | A45C 13/00 |
| WO | WO-2021062172 A1 | * | 4/2021 | |
| WO | WO-2022072402 A1 | * | 4/2022 | |
| WO | WO-2023076955 A1 | * | 5/2023 | |

* cited by examiner

FIG. 6 ly Application No. 62/906,964, filed on Sep. 27, 2019, which are incorporated herein by reference in their entireties.

POWER DISTRIBUTION FOR MODULAR STORAGE

CROSS-REFERENCE TO RELATED PATENT APPLICATION

The present application is a continuation of International Application No. PCT/US2020/052749, filed on Sep. 25, 2020, which claims the benefit of and priority to U.S. Provisional Application No. 62/906,964, filed on Sep. 27, 2019, which are incorporated herein by reference in their entireties.

BACKGROUND OF THE INVENTION

The present disclosure is directed generally to the field of tool storage systems and related devices. The present disclosure relates specifically to a device or tool storage container that includes a unit to charge electronic devices, and a coupling mechanism to detachably couple the device or tool storage container to another such device or container, such as in a modular tool storage system.

Tool storage units are often used to transport tools and tool accessories. Some storage units are designed to incorporate into a modular storage system. Within a modular storage system, different units, devices and/or containers may provide varying functions, such as being adapted to provide power.

SUMMARY OF THE INVENTION

According to an embodiment, this disclosure relates to a container including a housing that defines an internal compartment, the housing including a bottom surface and a first interface extending from the bottom surface, the first interface configured to couple the housing to a modular tool storage device, a top panel pivotally coupled to the housing, the top panel including an upper surface opposing the bottom surface, the upper surface including a second interface configured to couple the housing to the modular tool storage device, the second interface including a charging recess, and an inductive charger located beneath the charging recess.

According to another embodiment, this disclosure relates to a container including a housing that defines an internal compartment, the housing including a bottom surface and a first interface extending from the bottom surface, the first interface configured to couple the housing to a modular tool storage device, and a top panel pivotally coupled to the housing, the top panel including an upper surface opposing the bottom surface, the upper surface including a charging recess and a coupling recess. The charging recess is configured to receive a first electronic device. The coupling recess is configured to couple the housing to the modular tool storage device. The coupling recess defines a first depth from an uppermost surface of the top panel and the charging recess defines a second depth from the uppermost surface of the top panel that is greater than the first depth.

According to another embodiment, this disclosure relates to a container including a housing that defines an internal compartment, the housing including a bottom surface and a first interface extending from the bottom surface, the first interface being configured to couple the housing to a modular tool storage device, a top panel pivotally coupled to the housing, the top panel including an upper surface opposing the bottom surface, the upper surface including a coupling interface configured to couple the housing to the modular tool storage device, a battery interface configured to couple to a rechargeable power tool battery, and an inductive charger electrically coupled to the battery charger and configured to receive power from the rechargeable power tool battery coupled to the battery charger.

According to another embodiment, this disclosure relates to a tool storage device that includes a housing, a top panel coupled to the housing, and an inductive charger. The top panel defines several coupling recesses and at least one charging recess. The coupling recesses are configured to couple to another tool storage device. The inductive charger is coupled to the top panel beneath the charging recess. The tool storage device also includes a battery interface that couples to a removable rechargeable power tool battery. When a power tool battery is coupled to the interface the inductive charger receives power from the power tool battery.

In a specific embodiment the charging recess has a depth that is greater than the depth of the coupling recesses. The marginal increase of the depth of the charging recess permits a cell phone with a protective cover to be placed within the charging recess so as to not interfere with the coupling recesses engaging with the other tool storage device.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION

Referring generally to the figures, an embodiment of a stackable tool storage related device, container or unit is shown. One or more of the devices are configured to selectively couple and decouple with storage units. The tool storage device includes a top panel with a recess that is adapted to receive an electronic device (e.g., a cell phone, a smart watch, a tablet computer, a media player, etc.) to be charged. The tool storage device includes an inductive charger beneath the recess that charges the electronic device. In this arrangement, the charger charges the electronic device through the material of the top panel, while the electronic device rests within the recess without physically contacting the charger. The tool storage device also includes a battery interface that couples to a rechargeable removable power tool battery. When a power tool battery is coupled to the battery interface, the inductive charger recharges the electronic device.

Referring to FIGS. 1-6, a panel of a modular storage unit, container and/or device, such as top panel 26, is shown according to an exemplary embodiment. Top panel 26 is adapted to be coupled, such as being pivotally coupled, to a tool storage device, container and/or unit, such as container 10.

Figure 1:
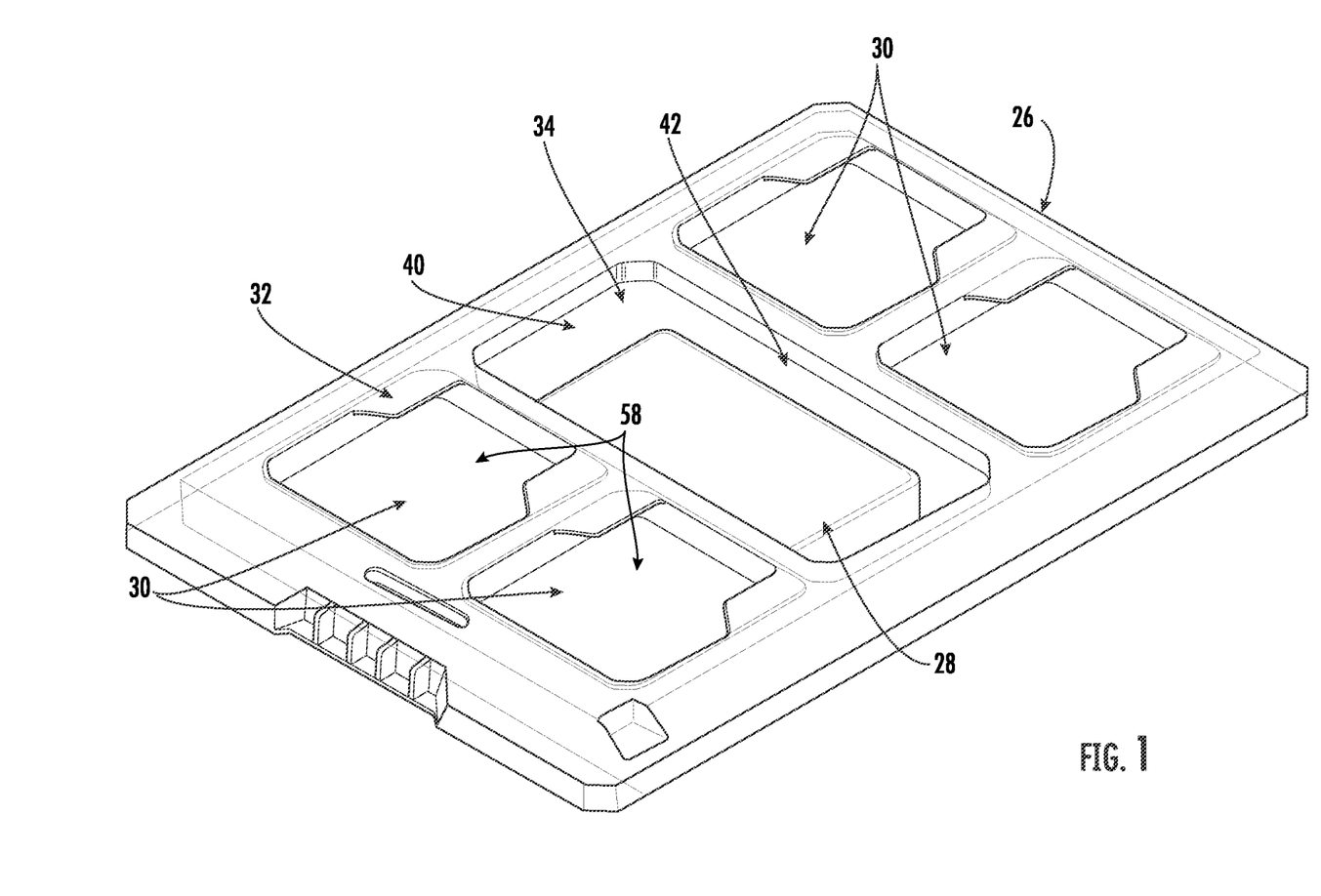
FIG. 1 is a perspective view of a top panel of a tool storage device, according to an exemplary embodiment.
Figure 2:
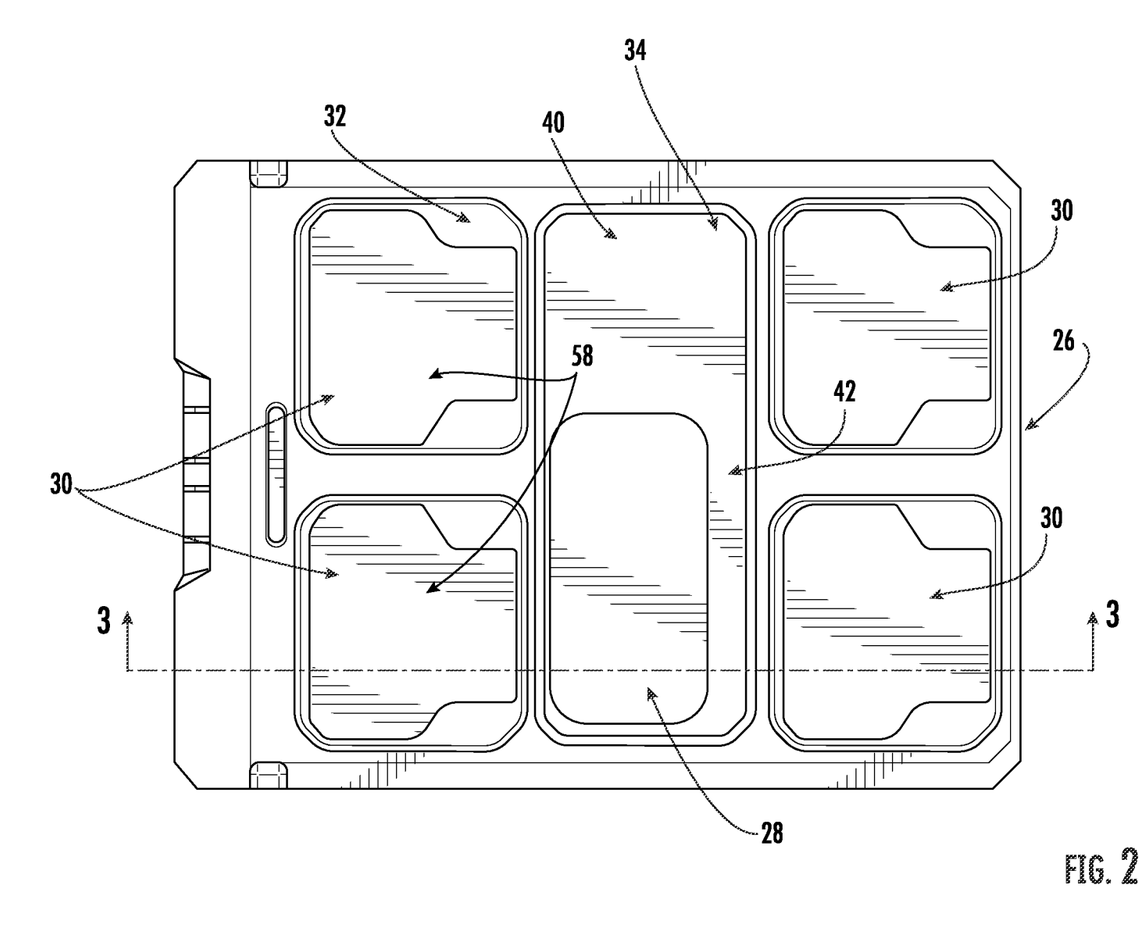
FIG. 2 is a top view of the top panel of FIG. 1, according to an exemplary embodiment.

Uppermost surface 60 of top panel 26 includes second interface 58 that includes several coupling recesses 30 that are adapted to be coupled to the modular tool storage device coupling mechanism(s). In specific embodiments, the coupling mechanisms utilized in the storage containers discussed herein are described in International Patent Application No. PCT/US2018/044629, which is incorporated herein by reference in its entirety.

Uppermost surface 60 of top panel 26 also includes a recess to charge an electronic device, shown as charging recess 34. Inductive charger 28 is coupled to top panel 26 and located beneath charging recess 34 to charge an electronic device placed in charging recess 34. Inductive charger 28 is configured to inductively recharge an electronic device stored within charging recess 34 (e.g., a cell phone or other electronic device that is inductively rechargeable).

Figure 3:
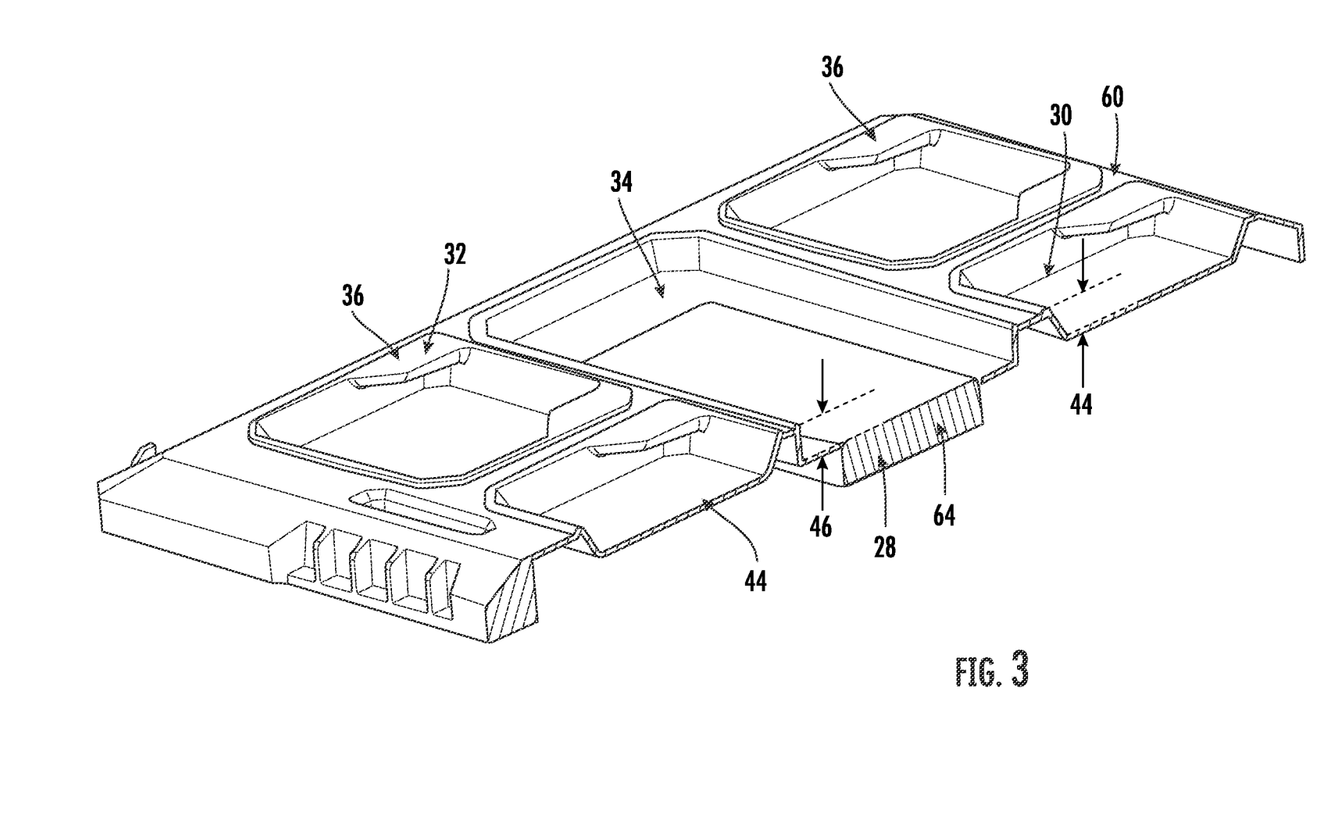
FIG. 3 is a perspective view of a cross-section of the top panel of FIG. 1 as defined along line 3-3 in FIG. 2, according to an exemplary embodiment.
Figure 4:
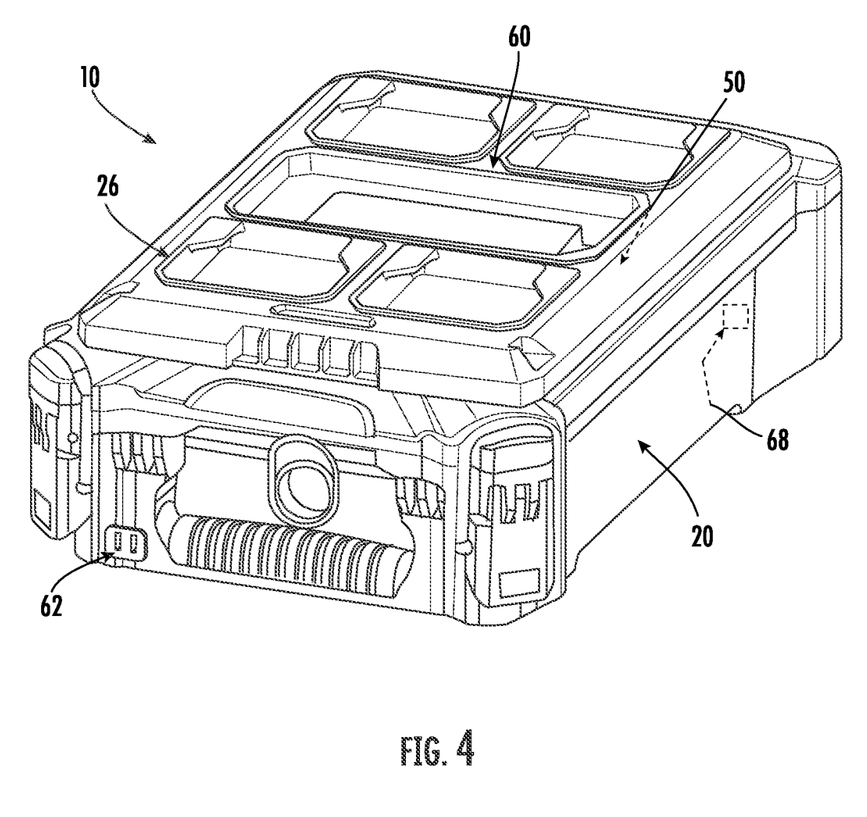
FIG. 4 is a perspective view of a tool storage device with the top panel of FIG. 1, according to an exemplary embodiment.

In one specific embodiment the inductive charging coils 64 of inductive charger 28 are embedded within top panel 26 beneath charging recess 34 (shown in FIG. 3). In another specific embodiment, the inductive charging coils of inductive charger 28 are supported within the tool storage container and/or device that top panel 26 is coupled to, and inductive charger is located beneath charging recess 34.

In a specific embodiment charging recess 34 does not include tabs 32 and charging recess 34 is uncovered in the upward direction. In specific embodiments, charging recess 34 has a length 40 of 185 mm and a width 42 of 92 mm. As shown in FIG. 2, charging recess 34 has a depth 46 that is the same as the depth 44 of coupling recesses 30.

In another specific embodiment charging recess 34 has a second depth 46 from uppermost surface 60 of top panel 26 that is greater than the first depth 44 of coupling recesses 30 from uppermost surface 60. The increased marginal second depth 46 of charging recess 34 relative to first depth 44 of coupling recess 30 permits a phone to be charging within charging recess 34 without interfering with another modular container being coupled to top panel 26.

When coupling top panel 26 of container 10 to another modular storage unit, the other modular storage unit has one or more projections that extend from its bottom face. The projections are configured to engage with the coupling recesses 30. Additionally, the other modular storage unit may have a projection that is positioned to couple with the area where charging recess 34 is located. Therefore, in a specific embodiment the depth 46 of charging recess 34 is adapted to receive both the electronic device being charged (e.g., a cell phone, a cell phone with a protective cover) and the projection from the other tool storage device positioned above charging recess 34. This permits the electronic device in charging recess 34 to be charged even while the top panel 26 is coupled to another storage device above the top panel 26.

In a specific embodiment, housing 20 of container 10 defines an internal compartment 50 that can be utilized for storage.

In a specific embodiment the container 10 includes battery interface 68 located within internal compartment 50. Battery interface 68 couples to a battery, such as a rechargeable, removable Lithium Ion power tool battery pack that attaches to and provides power to power tools, such as drills, saws, etc. When a power tool battery is coupled to container 10 via battery interface 68, the inductive charger 28 receives power from the power tool battery and recharges the electronic device located within charging recess 34.

In another specific embodiment, the container 10 includes another power supply, such as a power input for AC power 62. In yet another specific embodiment, the container 10 includes both a battery interface and another power supply such as AC power.

Figure 5:
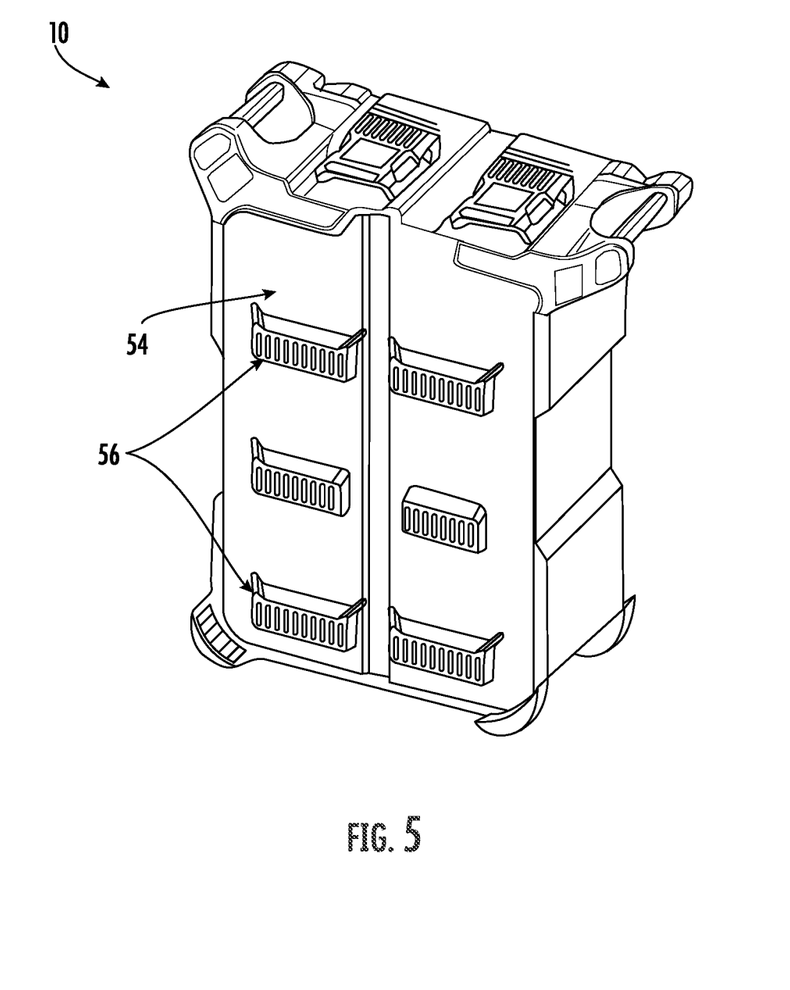
FIG. 5 is a perspective view of the tool storage device FIG. 4, according to an exemplary embodiment.
Figure 6:
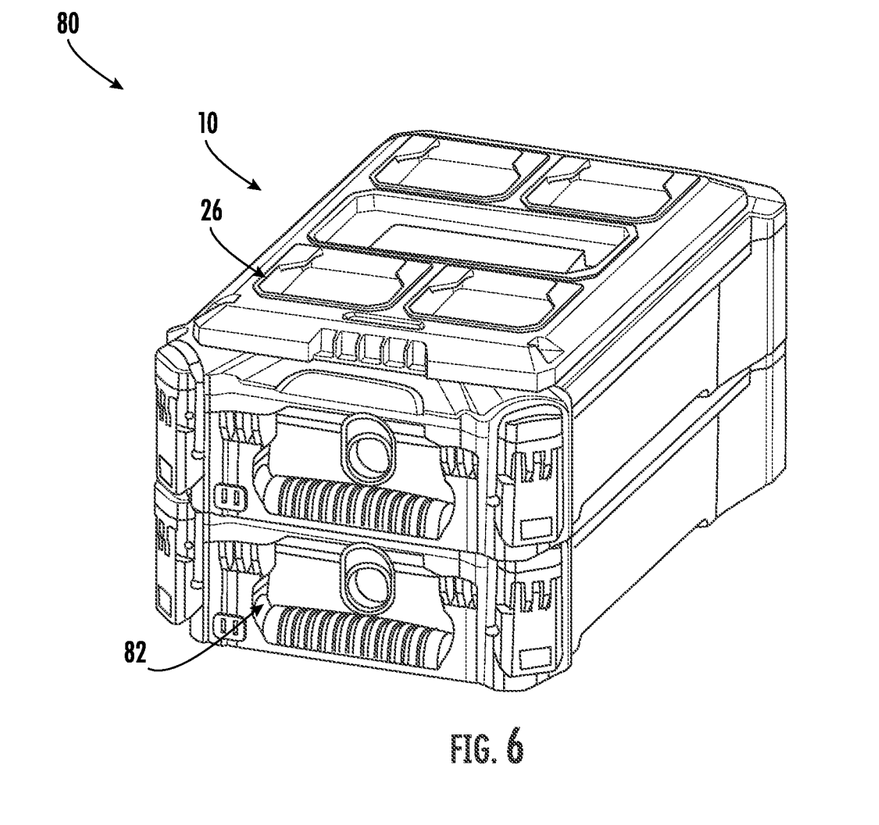
FIG. 6 is a modular storage system including the tool storage device of FIG. 4, according to an exemplary embodiment

Referring to FIGS. 5 and 6, bottom surface 54 of container 10 includes first interface 56. First interface 56 is configured to couple container 10 to modular storage containers, devices, and/or units, such as tool storage unit 82. Modular storage system 80 includes container 10 and one or more modular storage containers, devices, and/or units, such as tool storage unit(s) 82.

In a specific embodiment, charging recess 34 includes tabs 32 that extends over charging recess and thus charging recess 34 is configured to couple housing 20 of container 10 to other units, such as tool storage unit 82. In another specific embodiment, charging recess 34 is uncovered by top panel 26 such that no tabs 32 extend over charging recess 34.

In a specific embodiment, charging recess 34 may be located anywhere along top panel 26, including without limitation in place of one or both of the two upper coupling recesses 30 and/or in place of one or both of the two lower coupling recesses 30.

In various embodiments top panel 26 includes more than one charging recess 34 to charge electronic devices.

In a specific embodiment, charging recess 34 is adapted to receive more than one phone or other electronic device at a time (e.g., charging recess 34 is adapted to receive and charge a second electronic device, such as a cell phone, concurrently with a first electronic device, such as a cell phone, already being located within charging recess 34). For example, charging recess 34 has a depth 46 that is adapted to receive two electronic devices (e.g., two cell phones, two cell phone with protective covers).

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

I claim:

1. A container comprising:
a housing that defines an internal compartment, the housing comprising a bottom surface and a first interface extending from the bottom surface, the first interface configured to couple the housing to a modular tool storage device;
a top panel coupled to the housing, the top panel comprising an upper surface opposing the bottom surface, the upper surface comprising a second interface configured to couple the housing to the modular tool storage device, the second interface comprising a charging recess; and
an inductive charger located beneath the charging recess.

2. The container of claim 1, wherein the inductive charger is coupled to the top panel.

3. The container of claim 1, wherein the inductive charger includes inductive charging coils embedded within the top panel.

4. The container of claim 1, wherein the inductive charger includes inductive charging coils that are beneath the charging recess.

5. The container of claim 1, the second interface comprising a coupling recess is configured to couple the housing to the modular tool storage device.

6. The container of claim 5, wherein the coupling recess defines a first depth from an uppermost surface of the top panel and the charging recess defines a second depth from the uppermost surface of the top panel that is equal to the first depth.

7. The container of claim 1, the container comprising a power input configured to receive AC power.

8. A container comprising:
a housing that defines an internal compartment, the housing comprising a bottom surface and a first interface extending from the bottom surface, the first interface configured to couple the housing to a modular tool storage device; and
a top panel coupled to the housing, the top panel comprising an upper surface opposing the bottom surface, the upper surface comprising a charging recess and a coupling recess, the charging recess configured to receive a first electronic device, the coupling recess configured to couple the housing to the modular tool storage device, wherein the coupling recess defines a first depth from an uppermost surface of the top panel and the charging recess defines a second depth from the uppermost surface of the top panel that is greater than the first depth.

9. The container of claim 8, wherein the top panel includes a tab that extends over the coupling recess, and wherein the charging recess is uncovered by the top panel.

10. The container of claim 8, wherein the top panel includes a tab that extends over the charging recess.

11. The container of claim 10, wherein the charging recess is configured to couple the housing to the modular tool storage device.

12. The container of claim 8, wherein the charging recess is adapted to concurrently receive and charge a second electronic device in addition to the first electronic device.

13. The container of claim 8, further comprising an inductive charger coupled to the top panel.

14. The container of claim 8, the container comprising a power input configured to receive AC power.

15. A container comprising:
a housing that defines an internal compartment, the housing comprising a bottom surface and a first interface extending from the bottom surface, the first interface configured to couple the housing to a modular tool storage device;
a top panel coupled to the housing, the top panel comprising an upper surface opposing the bottom surface, the upper surface comprising a coupling interface configured to couple the housing to the modular tool storage device;
a battery interface configured to couple to a rechargeable power tool battery; and
an inductive charger electrically coupled to the battery interface and configured to receive power from the rechargeable power tool battery coupled to the battery interface;
wherein the upper surface comprises a charging recess adapted to receive and charge a first electronic device, wherein the top panel comprises a tab that extends over the charging recess, and wherein the charging recess is configured to couple the housing to the modular tool storage device.

16. The container of claim 15, wherein the coupling recess defines a first depth from an uppermost surface of the top panel and the charging recess defines a second depth from the uppermost surface of the top panel that is greater than the first depth.

17. The container of claim 16, wherein the charging recess is configured to couple the housing to the modular tool storage device.

18. The container of claim 15, wherein the charging recess is adapted to concurrently receive and charge a second electronic device in addition to the first electronic device.

19. The container of claim 15, the container comprising a power input configured to receive AC power.

* * * * *